United States Patent [19]

Lugo

[11] 3,799,726
[45] Mar. 26, 1974

[54] BAGEL FORMING MACHINE

[76] Inventor: John Lugo, 73 Green Meadow Rd., Milford, Conn. 06460

[22] Filed: Oct. 5, 1971

[21] Appl. No.: 186,698

[52] U.S. Cl................................. 425/364, 425/383
[51] Int. Cl............................................. A21c 11/00
[58] Field of Search .......... 425/364, 371, 363, 329, 425/319, 383, 374; 99/86, 90 R

[56] References Cited
UNITED STATES PATENTS

| | | | |
|---|---|---|---|
| 3,407,754 | 10/1968 | Wichinsky | 425/374 |
| 3,223,053 | 12/1965 | Jiminez et al. | 425/371 X |
| 2,602,960 | 7/1952 | Fischbein | 425/371 |
| 1,552,430 | 9/1925 | Gendler | 425/364 |
| 2,628,578 | 2/1953 | Roth | 425/364 X |
| 3,080,831 | 3/1963 | Paitchell et al. | 425/364 X |
| R25,536 | 3/1964 | Thompson | 425/364 |
| 3,433,182 | 3/1969 | Thompson | 425/319 X |

*Primary Examiner*—J. Spencer Overholser
*Assistant Examiner*—David S. Safran
*Attorney, Agent, or Firm*—DeLio and Montgomery

[57] ABSTRACT

A machine for forming dough or the like in which the dough is transported by an endless belt through a stationary die member and movable die members about a central mandrel to form a toroidal or annular shape of the dough.

4 Claims, 5 Drawing Figures

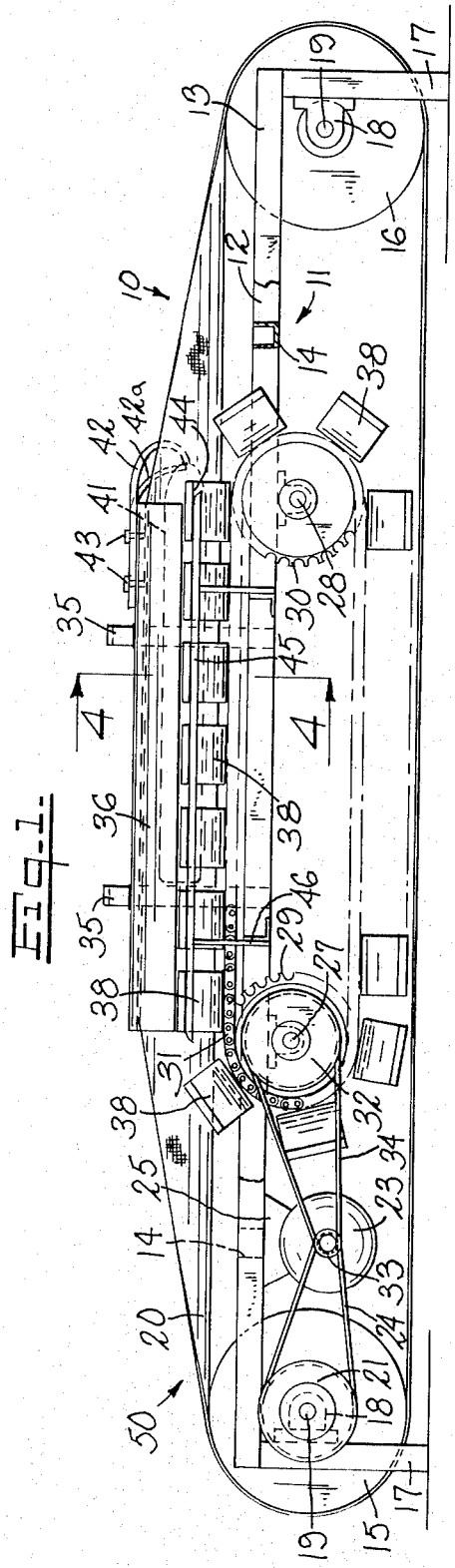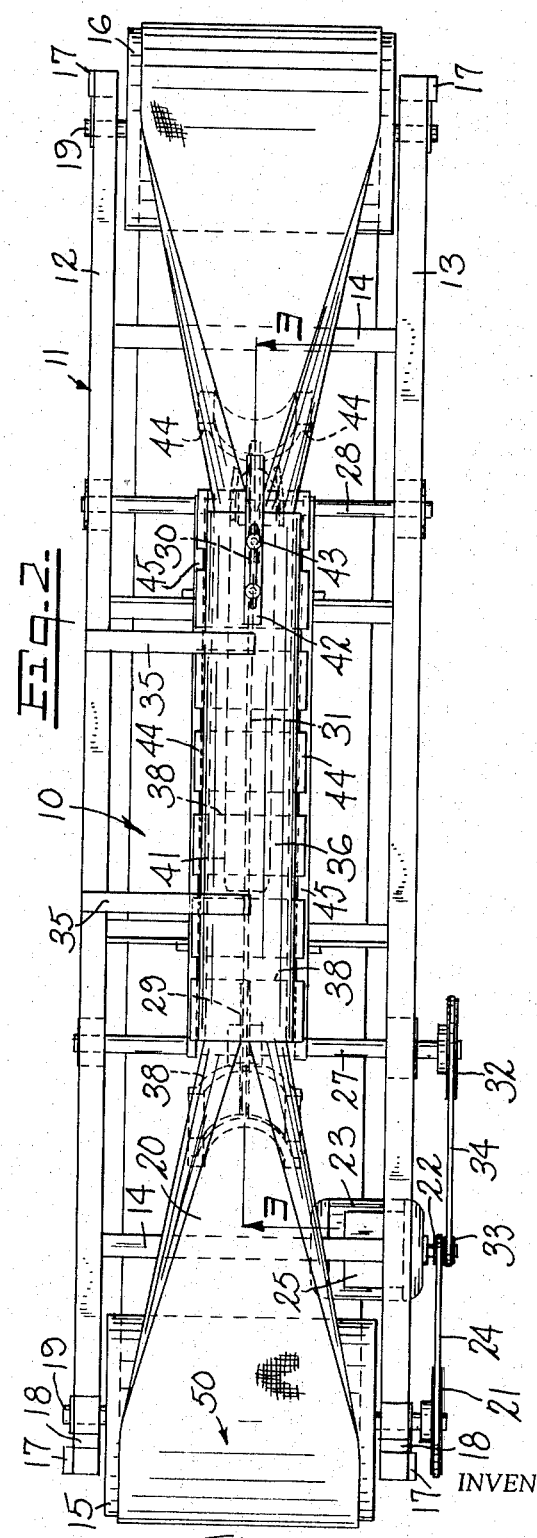

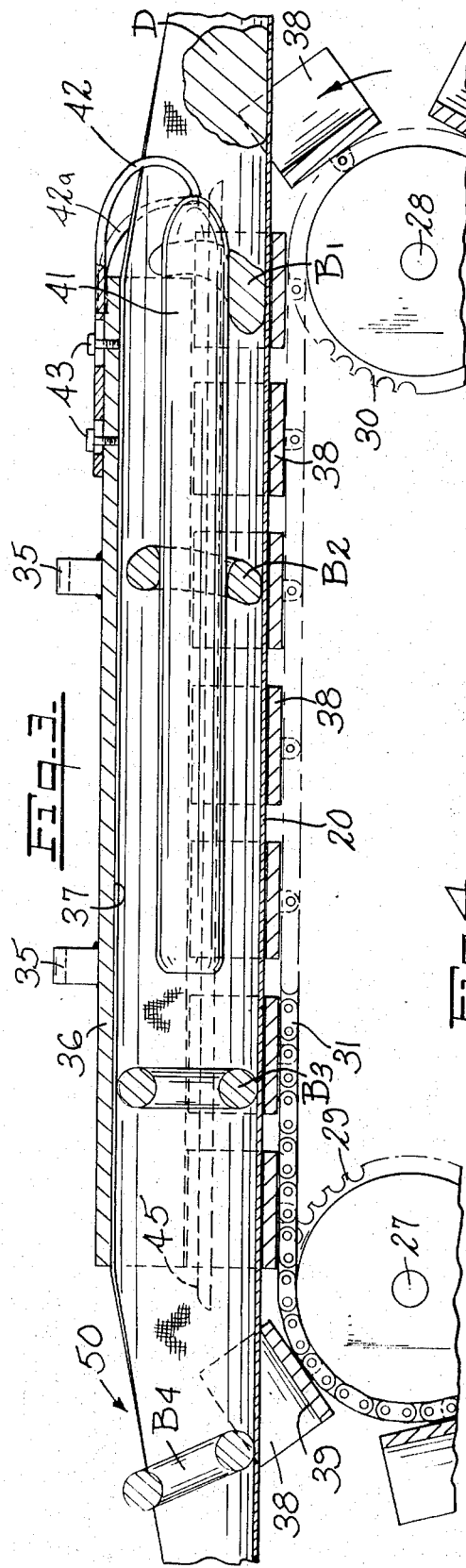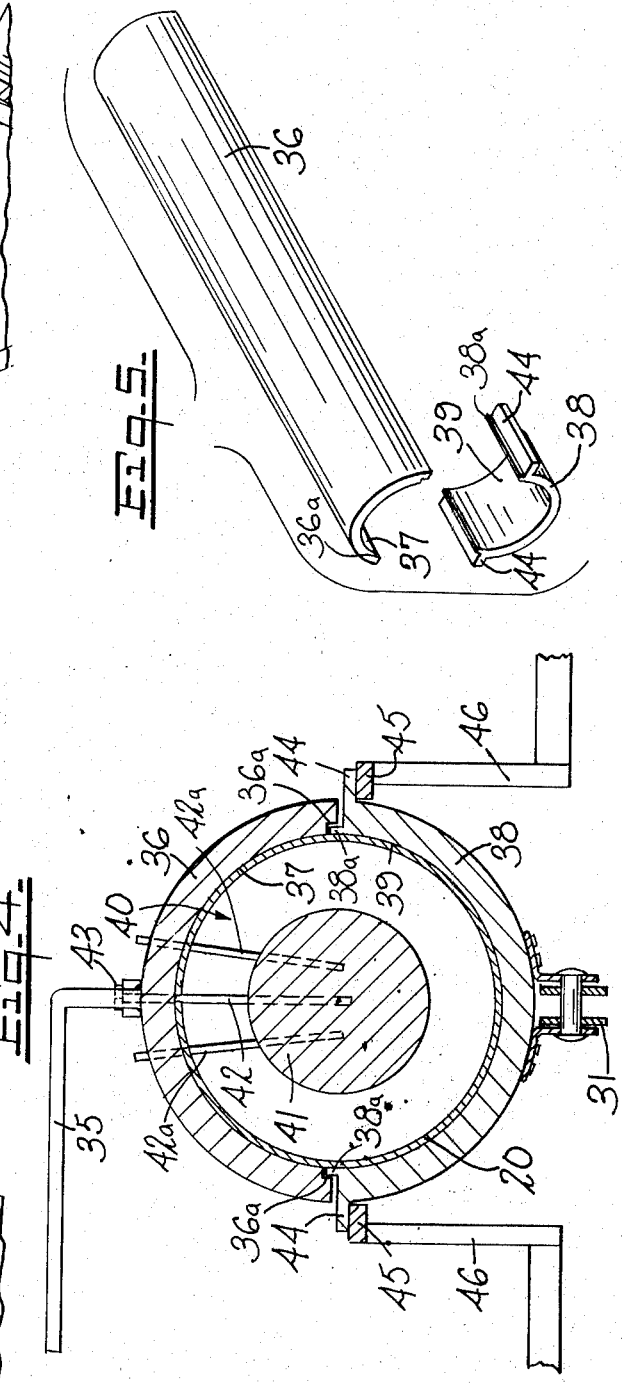

BAGEL FORMING MACHINE

This invention relates to machines for forming baking dough into a toroidal shape and more particularly relates to a machine for forming bagels.

When not formed by hand, bagel dough is commonly formed by moving a mass of dough through a cylindrical die or form with respect to a central mandrel which defines the opening in the formed product Bagels are made with dough which is particularly tough and elastic. The formed product, desirably, is uniform in thickness and without any seams or joint lines. Additionally, in forming the dough, it should not be kneaded excessively or it will not rise when baked.

In the forming of bagels, one technique is to pass an endless flexible belt through a cylindrical die having a mandrel coaxially positioned therein. As the dough moves through the die it is formed about the mandrel in a toroidal shape. With this type of mechanism, binding of the belt with the cylinder is often encountered. Additionally, the reject rate with respect to satisfactory final shape is often high, due to shearing or tearing of the dough as it moves along the die.

In another mechanism, the dough is again moved over a mandrel between abutting and moving, semi-cylindrical, cooperating die elements which are fed dough from a hopper or chute. The requirement for the double mold sections and lining thereof makes this a relatively expensive apparatus, not readily suitable for smaller bakeries.

The present invention provides a machine for the purposes described which is relatively low in cost and which provides accurately shaped bagels with a very high acceptance rate.

This is achieved through the provision of a die mechanism comprising an elongated stationary member defining a semi-cylindrical cavity and a plurality of spaced, movable die members cooperating with the stationary die member to define an elongated die about a central mandrel. A flexible belt receives a mass of dough and moves through the cylindrical die at the same velocity as the movable die members. The movement of the dough along the die and about the mandrel forms it into a toroidal or annular shape and the formed, but unbaked, bagel is discharged from the other end of the die.

An object of this invention is to provide a new and improved machine for forming bagel dough into the annular or toroidal bagel shape.

Another object of this invention is to provide a bagel dough forming machine having new and improved means for defining a bagel forming die cavity and transporting the dough therethrough while forming the bagel.

A further object of this invention is to provide a reliable bagel forming machine of simple construction and relatively low cost.

The features of the invention which are believed to be novel are particularly pointed out and distinctly claimed in the concluding portion of this specification. The invention, however, both as to its organization and operation, together with further objects and advantages thereof, may best be appreciated by reference to the following detailed description taken in conjunction with the drawings, wherein:

FIG. 1 is a side elevation of a machine embodying the invention;

FIG. 2 is a top plan view of the machine of FIG. 1;

FIG. 3 is a view in section seen in the plane of lines 3—3 of FIG. 2;

FIG. 4 is a view in section seen in the plane of lines 4—4 of FIG. 1; and

FIG. 5 is a view in perspective of the upper and of one of the lower die members utilized in the machine embodying the invention.

The use of the term bagel herein refers to the formed dough in the annular or toroidal shape, prior to baking or cooking thereof.

A machine 10 embodying the invention generally comprises a frame member 11 having spaced apart side frames 12 and 13 and cross members 14 extending therebetween.

Rotatably mounted to frame 14 at either end thereof are wheels or drums 15 and 16. Mounted to support legs 17 are bearing brackets 18 which rotably support the shafts 19 of the drums 15 and 16. Disposed around the drums 15 and 16 is an endless flexible belt 20.

To drive the belt 20, a pulley 21 is mounted on the shaft 19 of drum 15 and is coupled to a drive pulley 22 on the shaft of a motor 23 by a pulley or timing belt 24. Motor 23 may be mounted to frame 11 as by means of a bracket 25.

Rotatably carried between side frames 12 and 13 of frame 11 are shafts 27 and 28 which have rotatably mounted thereto sprocket type wheels 29 and 30, respectively. Disposed about the wheels 29 and 30 is an endless conveyor 31 of the conventional chain link type. A pulley 32 mounted to shaft 27 is connected to a drive pulley 33 on the shaft of motor 23 by a pulley or timing belt 34.

The dimensions of pulleys 21 and 32 are such that the belt 20 and conveyor 31 are driven at the same linear speed.

Carried by frame 11 on overhung members 35 is a stationary die member 36 having an internal surface 37 which is essentially semi-cylindrical in form as most clearly shown in FIG. 4. Attached to conveyor 31 at spaced apart intervals are individual movable die members 38 having internal surfaces 39 which are essentially semicylindrical and which cooperate with surface 37 to define a cylinder, generally indicated by the reference numeral 40.

Extending along a major portion of the length of cylinder 40 is a mandrel 41 disposed essentially coaxially within the cylinder 40. Mandrel 41 is carried by a support 42 (FIGS. 3 and 4) which is, in turn, affixed to the upper surface of member 36 as by a plurality of bolts 43.

The lower die elements 38 move with conveyor 31 and have outwardly extending flanges or lips 44 which ride on guide means in the form of rails 45. Rails 45 are carried on supports 46 which are, in turn, supported from side frames 12 and 13.

The terminal edges of die member 36 are relieved as indicated by the reference numeral 36a, and the lower die members 38 have ridges or lips 38a received therein. This arrangement provides a closer seal between the upper and lower die members. Also, it reacts any tendency of side movement of the lower die members due to the forming pressures involved.

In operation, a mass of dough indicated at D in FIG. 3 is placed on belt 20. As belt 20 moves between upper die member 36 and lower die members 38 it attains a generally cylindrical shape about mandrel 41, as most clearly shown in FIG. 4. The belt is chosen to have a width essentially the same as the periphery of cylinder 40. As the mass of dough D enters the cylindrical cavity 40 it will be carried on the belt 20 and through the cylindrical die defined by member 36 and the members 38. The relative movement of the dough along or about mandrel 41 forms the bagel dough into an annulus or toroidal shape as the dough moves progressively along the die, as indicated by the shapes B1, B2, B3 and B4, FIG. 3.

Additional members 42a attached to the end of mandrel 41 serve to position and set up the mass of dough D as it initially enters the die. The members 42a may also serve as mandrel supports.

With the arrangement described, the lower die members 38 provide support for the mass of dough D that is to be formed into bagels. The lower die elements 38 and the belt 20 moving at the same speed have no relative velocity within the cylindrical die and hence there is no friction therebetween. The internal walls 37 of the die member 36 and the internal walls 39 of the cooperating die members react on the forming forces.

Therefore, the belt 20 and more explicitly the portions of the belt subtended by the side edges thereof have frictional engagement only with the stationary die member 36. It will further be noted that within the cylindrical surfaces 37 there is a discontinuity between the belt 20 at the edges thereof, as indicated by the reference numeral 48. Therefore, there will be little tendency or likelihood of the belt 20 binding within the stationary die member 36.

As the mass of dough passes into the cavity about the mandrel 41 it is of sufficient mass or volume that it will be kneaded and worked around the mandrel 41 so as to form the bagel to its final shape by the time it passes the mandrel 41. The finished bagel B3 and B4 is then moved on belt 20 toward the discharge end 50 of the machine 10. From there it may be discharged into a hopper or tray and carried to an oven for baking or, alternatively, may be frozen for later cooking.

The mass of dough D may initially be formed into an elongated section to facilitate its forming to a circular shape about the mandrel.

The disclosed machine provides a die arrangement which not only forms the bagel, but which also aids in transporting the bagel or bagel dough through the die cavity. This essentially reduces or eliminates any possibility of the belt 20 binding within the elongated die. Moreover, it has been determined that the disclosed machine provides formed bagels with a very high acceptance rate. There is no tearing or shearing of the tough, elastic bagel dough.

If desired, the position of the upper die member 36 and the lower die members 38 could be reversed. This would require that guides or rails 45 be provided for both the upper and lower surfaces of flanges 44.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

I claim:

1. A machine for forming dough in the shape of an annulus comprising a frame member, an endless flexible belt supported on said frame, an elongated member supported by said frame and having an internal surface defining a portion of a cylinder, an endless conveyor supported on said frame, said conveyor carrying a plurality of segments having internal surfaces defining a portion of a cylinder, said internal surfaces of said elongated member and said segments together defining an elongated essentially cylindrical passage, a mandrel supported coaxially of said passage, said belt being received within said elongated member and said segments and being of sufficient width to essentially cover the cylindrical surfaces, and drive means for moving said belt and said conveyor past said elongated member.

2. The machine of claim 1 wherein the elongated member is positioned above said segment conveyor, segment guide means supported on said frame, said segments moving on said guide means beneath said elongated member.

3. The machine of claim 1 wherein said drive means moves said belt and said segments at the same speed past said elongated member.

4. The machine of claim 1 wherein said flexible belt is disposed about spaced apart wheels and defines a second conveyor, said conveyor carrying said segments is disposed within the outline of said belt, and drive means for moving said conveyors at the same lineal speed.

* * * * *